(12) United States Patent
Aoba

(10) Patent No.: US 8,965,114 B2
(45) Date of Patent: Feb. 24, 2015

(54) OBJECT RECOGNITION APPARATUS, OBJECT RECOGNITION METHOD, LEARNING APPARATUS, LEARNING METHOD, STORAGE MEDIUM AND INFORMATION PROCESSING SYSTEM

(75) Inventor: Masato Aoba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 291 days.

(21) Appl. No.: 13/298,641

(22) Filed: Nov. 17, 2011

(65) Prior Publication Data

US 2012/0155751 A1   Jun. 21, 2012

(30) Foreign Application Priority Data

Dec. 16, 2010   (JP) ................. 2010-281008

(51) Int. Cl.
*G06K 9/62* (2006.01)
*G06T 7/00* (2006.01)
*G06T 7/60* (2006.01)
*G06K 9/00* (2006.01)

(52) U.S. Cl.
CPC ... *G06T 7/00* (2013.01); *G06T 7/60* (2013.01); *G06K 9/00214* (2013.01)
USPC ............ 382/159; 382/103; 382/291; 382/100

(58) Field of Classification Search
CPC ............... G06K 9/62; G06K 9/32; G06T 7/20
USPC .......................................... 382/159, 103, 291
See application file for complete search history.

(56) References Cited

U.S. PATENT DOCUMENTS 5,638,465 A    6/1997   Sano et al.
7,627,178 B2   12/2009  Suzuki et al.

FOREIGN PATENT DOCUMENTS

JP   3346679 B2      11/2002
JP   2003-271975 A    9/2003
JP   2004-326693 A   11/2004
JP   2008-204103 A    9/2008

OTHER PUBLICATIONS

Leibe et al: "Robust object detection with interleaved categorization and Segmentation", Int. J. Computer Vision, 2008.*
Knopp et al: "Hough Transform and 3D SURF for Robust Three Dimensional Classification", Computer Vision—ECCV, Sep. 5-11, 2010.*
Bay et al, "SURF: Speeded up robust features", SVBH, 2006.*
P.J. Besl, et al., "A Method for Registration of 3-D Shapes", IEEE Transactions on Pattern Analysis and Machine Intelligence, vol. 14, No. 2, pp. 239-256 (Feb. 1992).

* cited by examiner

*Primary Examiner* — Ruiping Li
(74) *Attorney, Agent, or Firm* — Fitzpatrick, Cella, Harper & Scinto

(57) ABSTRACT

A learning method of detectors used to detect a target object, comprises: a selection step of selecting a plurality of specific regions from a given three-dimensional model of the target object; a learning step of learning detectors used to detect the specific regions selected in the selection step; an evaluation step of executing recognition processing of positions and orientations of predetermined regions of the plurality of specific regions by the detectors learned in the learning step; and a normalization step of setting vote weights for outputs of the detectors according to recognition accuracies of results of the recognition processing in the evaluation step.

16 Claims, 12 Drawing Sheets

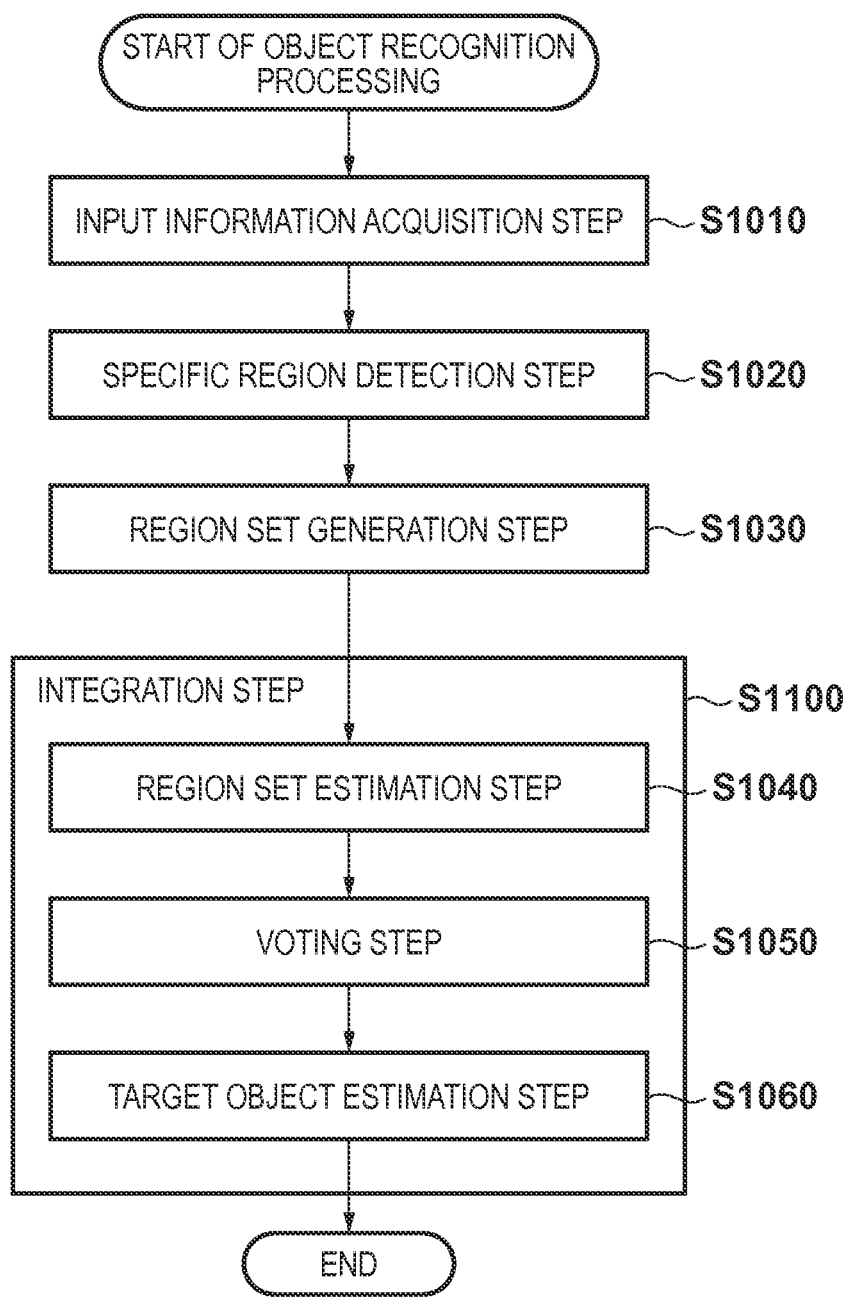

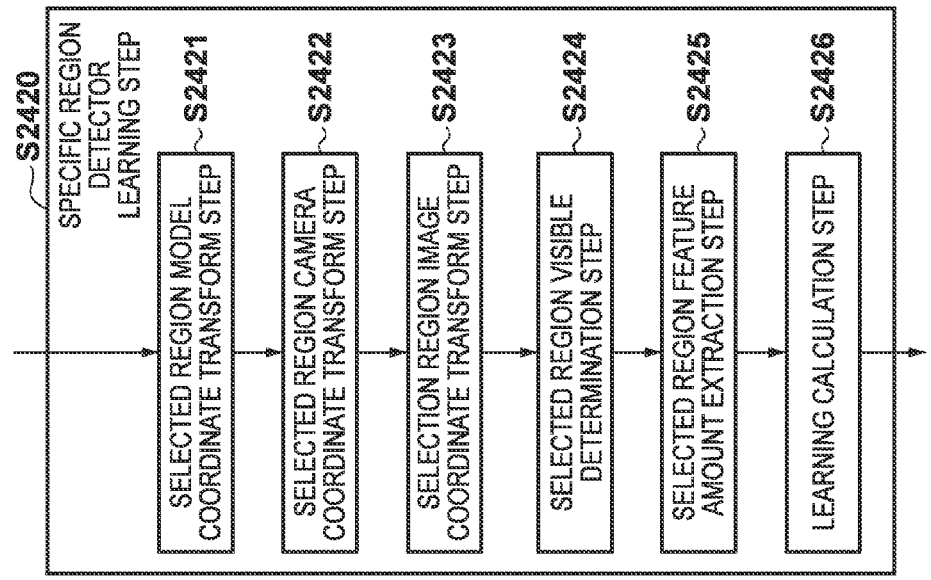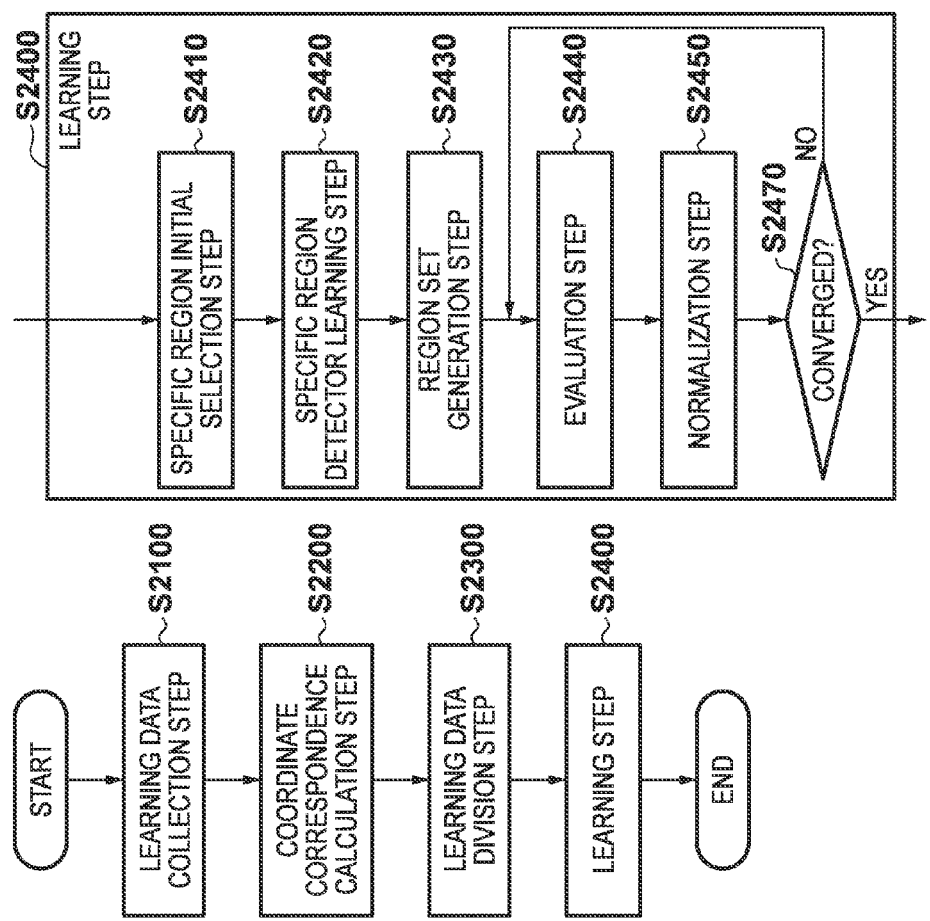

F I G. 11
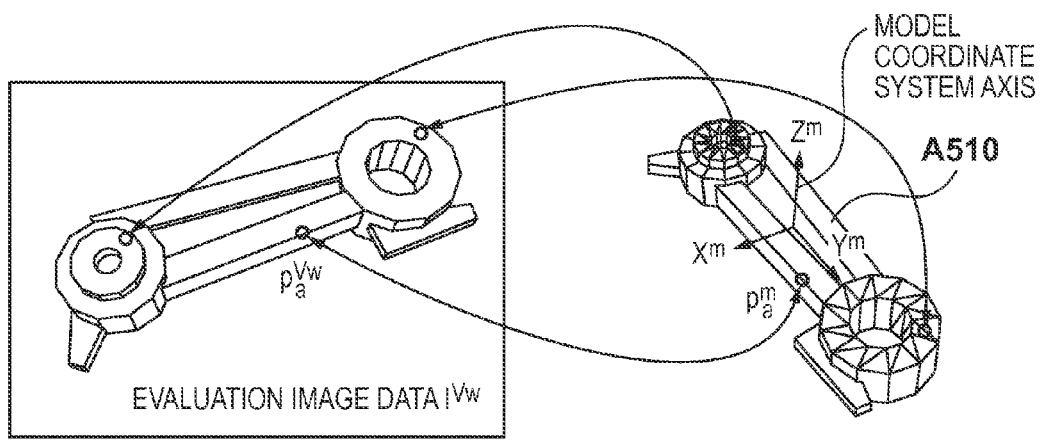

OBJECT RECOGNITION APPARATUS, OBJECT RECOGNITION METHOD, LEARNING APPARATUS, LEARNING METHOD, STORAGE MEDIUM AND INFORMATION PROCESSING SYSTEM

BACKGROUND OF THE INVENTION

1. Field of the Invention

The present invention relates to an object recognition apparatus, object recognition method, learning apparatus, learning method, storage medium, and information processing system.

2. Description of the Related Art

In the field of object recognition that use visual information, various studies and developments have been made in association with problems to estimate a three-dimensional (3D) position and orientation of an object. In the field of industrial robots or experimental humanoid robots, 3D information is often used for the purpose of, for example, random picking, and its necessity becomes higher.

As for a target object with a given shape, position/orientation estimation of the target object using a monocular camera is also executed. As one 3D orientation estimation method using the monocular camera, a method of identifying various orientations as different classes is known. Also, a method of using 3D feature amounts obtained using a stereo camera or 3D sensor such as a laser rangefinder is known. In this method, a correspondence relationship between a plurality of feature points on a model and 3D feature amounts is calculated, and a position and orientation of an object are calculated using rigid transform. In a target object recognition method by units of voting or integration processing of a plurality of detectors, a method of adjusting weights of votes has also be proposed. For example, Japanese Patent Laid-Open No. 2008-204103 recognizes an entire image by integrating outputs of recognition devices by a plurality of tree structure filters. By recombining the recognition devices or by selecting weights at the time of integration, a whole recognition system is updated by being adapted to an environment.

Japanese Patent No. 03346679 detects quantized feature points from an input image and calculates a position and orientation of a target object using weighted generalized Hough transform from the obtained feature points. In this case, weights of feature points are calculated in advance from histograms of the feature amounts at the respective feature points.

Japanese Patent Laid-Open No. 2008-204103 prepares in advance weight variations of recognition devices, and selects a weight corresponding to the best detection result from their combinations. Since weight decision is discretely executed, a search speed and granularity of weight variations have a tradeoff relationship. Upon examination of recognition of a target object at an arbitrary orientation, feature amounts change depending on changes in viewpoint even for an identical portion on the target object.

When the method of Japanese Patent No. 03346679 is to be expanded to recognition of a target object at an arbitrary 3D orientation, it is difficult to decide vote weights from feature amount histograms.

SUMMARY OF THE INVENTION

In consideration of the aforementioned problems, the present invention provides a learning technique and object recognition technique, which allow to accurately recognize a target object by attaching importance to votes from region sets with high reliabilities corresponding to an orientation of the target object.

According to one aspect of the present invention, there is provided a learning method of detectors used to detect a target object, comprising: a selection step of selecting a plurality of specific regions from a given three-dimensional model of the target object; a learning step of learning detectors used to detect the specific regions selected in the selection step; an evaluation step of executing recognition processing of positions and orientations of predetermined regions of the plurality of specific regions by the detectors learned in the learning step; and a normalization step of setting vote weights for outputs of the detectors according to recognition accuracies of results of the recognition processing in the evaluation step.

According to the present invention, a target object can be accurately recognized by attaching importance to votes from highly reliable region sets corresponding to an orientation of the target object. Alternatively, since vote weights from region sets corresponding to orientations with low reliabilities become weaker than votes from region sets corresponding to orientations with high reliabilities, detection errors are hard to occur, thus improving recognition accuracy of the target object.

Further features of the present invention will become apparent from the following description of exemplary embodiments (with reference to the attached drawings).

BRIEF DESCRIPTION OF THE DRAWINGS

FIG. 3 is a flowchart for explaining the sequence of the object recognition processing according to the embodiment;

FIGS. 7A to 7C are flowcharts for explaining the sequence of learning processing according to the embodiment;

FIG. 11 is a view showing the relationship between a model coordinate system and points on an image;

DESCRIPTION OF THE EMBODIMENTS

First Embodiment

Figure 1:
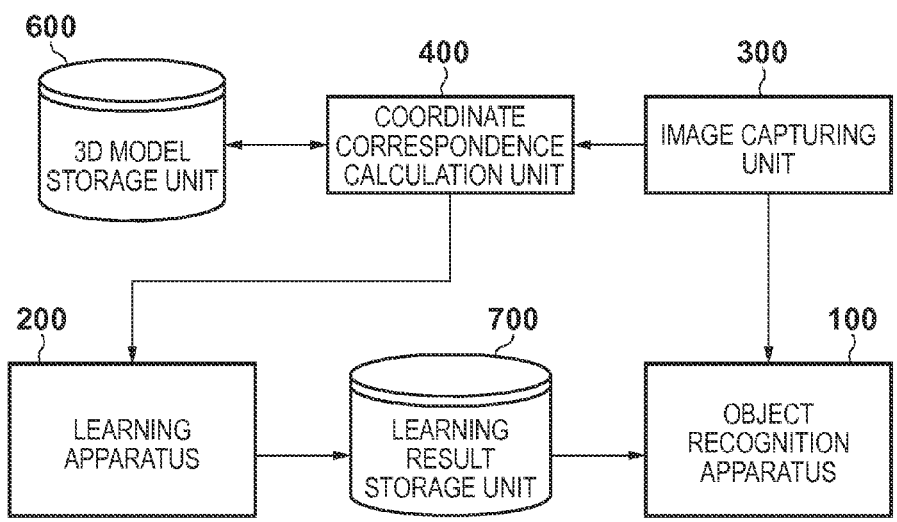
FIG. 1 is a block diagram showing an example of the overall arrangement of an information processing system according to an embodiment.

The overall arrangement of an information processing system according to an embodiment of the present invention will be described below with reference to FIG. 1. Image data captured by an image capturing unit 300 is sent to a coordinate correspondence calculation unit 400. The coordinate correspondence calculation unit 400 calculates a correspondence relationship between the captured image data and respective points on a 3D model stored in a 3D model storage unit 600. A leaning apparatus 200 executes learning processing (to be described later) using the correspondence relationship between the captured image data and 3D model calculated by the coordinate correspondence calculation unit 400, and stores obtained learning results (learning parameters) in a learning result storage unit 700.

The image data captured by the image capturing unit 300 is sent to an object recognition apparatus 100, which applies recognition processing (to be described later) to the captured image data according to the learning parameters stored in the learning result storage unit 700, thus obtaining a recognition processing result of the captured image data. In this case, the recognition processing is position/orientation estimation processing for calculating a 3D position and orientation of a 3D object as a detection target object from the captured image data captured by the image capturing unit 300.

(Object Recognition Method)

Figure 2:
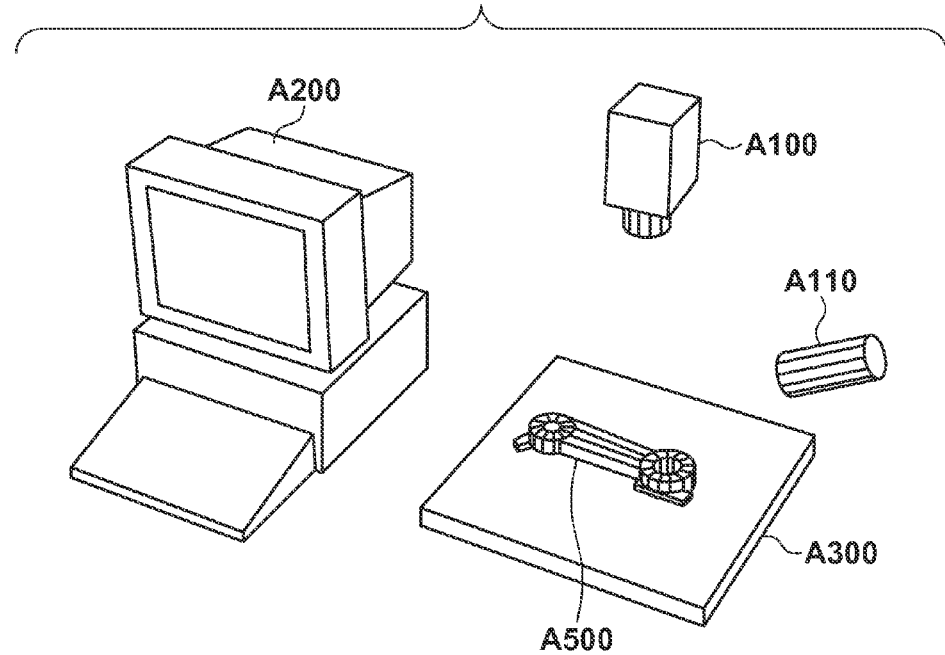
FIG. 2 is a view showing an example of the apparatus configuration required to execute object recognition processing according to the embodiment.

FIG. 2 shows an example of a basic apparatus configuration required to execute the object recognition processing, and FIG. 3 shows the processing sequence executed by the object recognition apparatus.

Reference symbol A500 denotes a target object to be recognized. Reference symbol A300 denotes a stage on which the target object A500 is to be placed. Reference symbol A100 denotes a camera used to acquire image data by capturing an image of the target object A500. Reference symbol A110 denotes a laser beam projection unit (laser projector) which operates using a galvano mirror and the like so as to obtain range map data of the target object A500 by a light-section method in cooperation with the camera A100. The camera A100 and laser projector A110 correspond to the image capturing unit 300 shown in FIG. 1. Assume that the camera A100 and laser projector A110 have undergone calibration required to make a distance measurement by the light-section method. In this case, the distance measurement by the light-section method has been exemplified as the apparatus configuration required to execute the recognition processing, but a distance measurement method is not limited to the light-section method. For example, various other distance measurement methods such as spatial coding using a projector in place of the laser projector A110 and a stereo measurement using a plurality of cameras are applicable. Reference symbol A200 denotes an information processing apparatus required to execute 3D object detection processing. The information processing apparatus A200 corresponds to the object recognition apparatus 100 shown in FIG. 1.

Assume that learning results of the learning processing (to be described later) are stored in an internal memory (not shown) of the information processing apparatus A200. This internal memory corresponds to the learning result storage unit 700 shown in FIG. 1. The object recognition apparatus 100 (information processing apparatus A200) required to execute the recognition processing is not limited to the apparatus independent of the camera A100 unlike in this example. For example, the camera A100 may include functions of the object recognition apparatus 100 (information processing apparatus A200), and the camera itself may execute the recognition processing.

The object recognition processing according to this embodiment will be described below with reference to FIG. 3 taking as an example a case in which the apparatus configuration shown in FIG. 2 is assumed. This processing is executed by a control unit which controls the overall operation of the object recognition apparatus 100 (information processing apparatus A200). In an input information acquisition step S1010, an image of the target object captured by the image capturing unit 300 is acquired. An input image I and range map Zmap are acquired by the camera A100 and laser projector A110 as input information used in the recognition processing. The range map Zmap is obtained as distances in a depth direction (Z direction) of a camera coordinate system from the camera A100 to respective image coordinate points p on the input image I. Since the range map can be calculated by an existing triangulation method or the like, a description thereof will not be especially given. From the range map Zmap and calibration values of the distance measurement, an X-coordinate map indicating a horizontal direction perpendicular to the depth direction (Z direction) on the camera coordinate system, and a Y-coordinate map indicating a horizontal direction perpendicular to the Z and X directions can also be calculated. Let Xmap and Ymap be these maps.

Figure 4A:
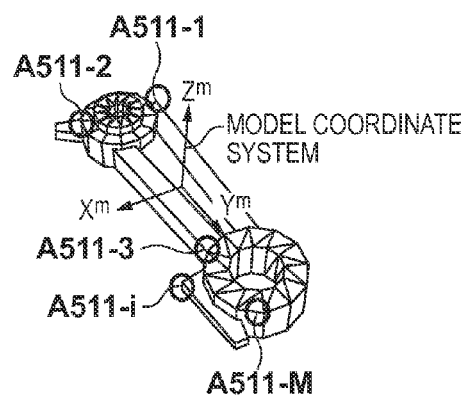
FIGS. 4A to 4D are views for explaining specific regions and region sets.
Figure 5:
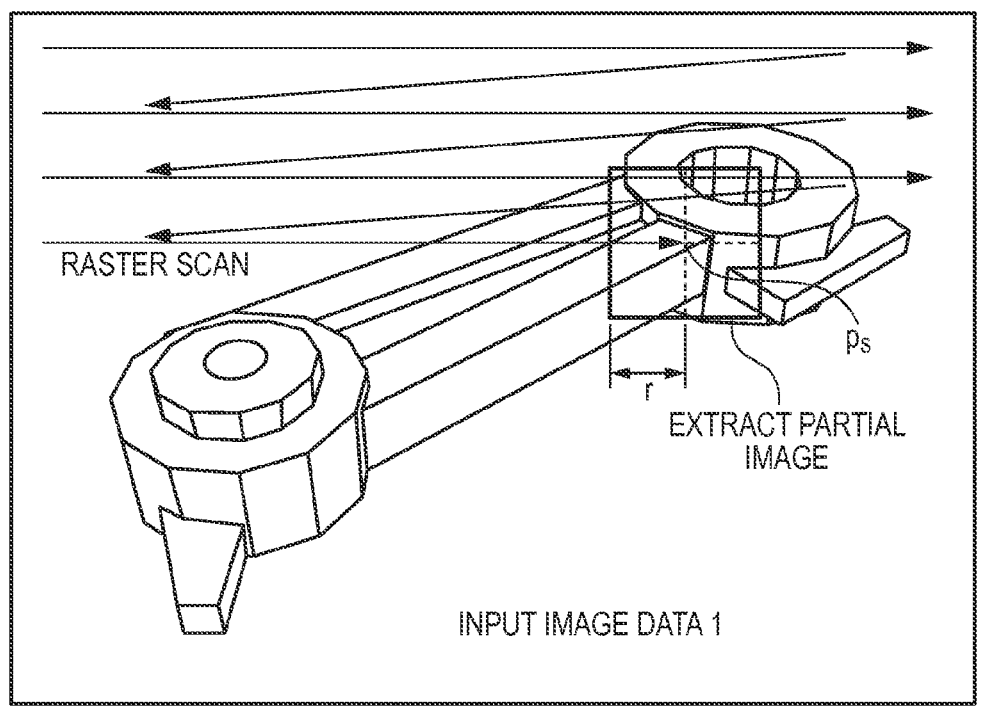
FIG. 5 is a view for explaining processing in a specific region detection step.

Next, in a specific region detection step S1020, a plurality of specific regions are detected from the image acquired in the input information acquisition step S1010 as images of partial regions included in the image. In this step, specific regions on an object are detected by specific region detectors, which have already been obtained by the learning processing (to be described later). In this case, the specific region is a local region (partial region) on the target object obtained as the 3D model. For example, specific regions A511-1 to A511-M indicate specific positions on a 3D model A510 shown in FIG. 4A where M is the total number of specific regions. Each of these specific regions has position information on a model coordinate system, and a model coordinate position of a specific region i is given by $P^m_i = [X^m_i, Y^m_i, Z^m_i]^T$ where superscript m means "model", and T represents transposition of a matrix. In the specific region detection step S1020, each specific region detector extracts a partial image having a position $p_s$ of interest as the center while raster-scanning the input image I, as shown in FIG. 5, and detects a specific region using feature amounts extracted from that partial image. A clipping size r of the partial image is calculated based on a fixed size R on the model coordinate system, which is decided in advance, and a depth distance of the position $p_s$ of interest by:

$$r = \frac{f}{Zmap(p_s)\delta} R \quad (1)$$

where δ is a pixel size of the camera, and f is a focal length of the camera. For example, when the clipping size is set as R=20 mm, if $Zmap(p_s)$=800 mm is obtained by the camera having f=24 mm and δ=0.03 mm/pixel, since r=20 pixels, a region of 20 pixels×20 pixels can be clipped as a partial image. As feature amounts to be extracted in the partial image, for example, HOG (Histograms of Oriented Gradients) may be used. However, the gist of the present invention is not limited to such specific type of feature amounts. For example, 3D feature amounts using 3D information of an object to be recognized such as Spin Image in place of the input image I may be used.

A set of detected regions of the specific region i detected by an image search conducted by the specific region detector is expressed by $Ai=[x_{i1}, x_{i2}, \ldots, x_{iNi}]$ where $x_{i1}$ indicates a position on an image of the 1-th detected region of the specific region i detected by the specific region detector, and a point on an image coordinate system. $N_i$ is the total number of detected points of the specific region i detected by the specific region detector. A position on the camera coordinate system of each detected region position $p_{il}$ can be obtained as $P_{il}=[X_{il}, Y_{il}, Z_{il}]=[Xmap(p_{il}), Ymap(p_{il}), Zmap(p_{il})]$.

In a region set generation step S1030, region sets are generated by combining specific regions which fall within a predetermined distance range of the plurality of specific regions detected in the specific region detection step S1020. For the specific regions detected in the specific region detection step S1020, region sets as combinations of specific regions, which are defined in advance, are generated. A region set is a combination of specific regions used to estimate a position and orientation of the object to be recognized. For T region sets, which are defined in advance, let $t_1, t_2, \ldots, t_{Mt}$ be specific regions which construct a region set t where MT is the total number of specific regions which construct the region set t. When a camera coordinate system position of each detected region is calculated by, for example, the distance measurement, positions of at least three points on the camera coordinate system need only be detected so as to decide a position and orientation. A region set constructed by three specific regions will be referred to as a triplet hereinafter, but the number of points used to construct the region set is not limited to three.

Figure 4B:
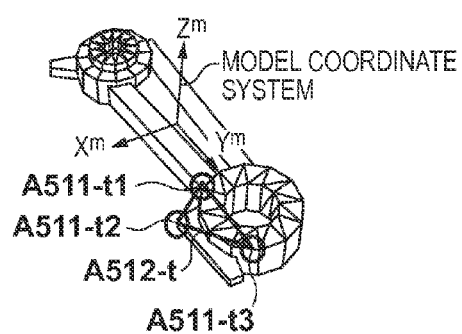

FIG. 4B shows an example of a triplet as the region set when MT=3. When specific regions as elements of the region set t are detected in the specific region detection step S1020, it is determined in the region set generation step S1030 whether or not a relative positional relationship between the specific regions detected in step S1020 satisfies a geometric restraint condition. The geometric restraint condition is determined, for example, as follows. In association with combinations of specific region pairs which construct the region set t, a distance between specific regions in the specific region pair is calculated on the camera coordinate system. The obtained distance is compared with a distance (that on the model) between specific regions in the specific region pair on a corresponding given 3D model to calculate a distance error, and it is then determined whether or not the calculated distance error falls within a predetermined threshold error range. If the calculated distance error falls within a range of 10% (a range of ±5%) of the distance on the model, it is determined that the distance relationship of the detected specific region pair is normal, and it is left as a detected region set candidate. The magnitude of this error is defined as a detection accuracy. In association with a combination of the detected specific region pair which is left as a detected region set candidate and constructs the region set t, an angle made between specific regions in the specific region pair is calculated on the camera coordinate system. The obtained angle is compared with that made between specific regions on the corresponding given 3D model, and it is determined whether or not an angle error falls within a predetermined threshold error range. For example, if the error falls within a range of 15 deg (±7.5 deg), it is detected that the relative positional relationship of the detected specific regions is correct, and these regions construct the region set.

In an integration step S1100, estimation results of positions and orientations (angles) in the respective detected region sets are calculated, and are integrated to obtain a recognition result of the target object. The integration step S1100 includes three steps, that is, a region set estimation step S1040 of estimating positions and orientations of the region sets, a voting step S1050, and a target object estimation step S1060 of estimating the position and orientation of the target object.

Figure 6:
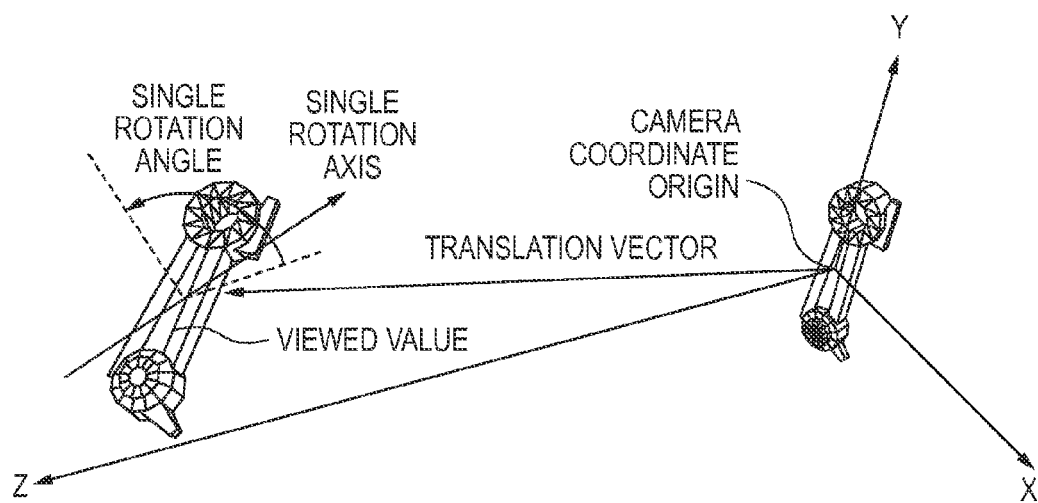
FIG. 6 is a view for explaining definitions of a detected position and detected orientation.

In the region set estimation step S1040, positions and orientations of the region sets (detected object) narrowed down in the region set generation step S1030 are estimated. For the region sets generated in the region set generation step S1030, detected position information with reference to the coordinate system of the image capturing unit and coordinate position information on the 3D model of the target object are calculated. A position which minimizes a difference between the detected position information and coordinate position information, and an orientation corresponding to that position are calculated as an estimated position and estimated orientation of each region set. Assume that, as shown in FIG. 6, the position and orientation of the detected object are expressed by a translation vector, a single rotation axis, and a single rotation angle when the detected object is translated and single-rotated from a state in which the model coordinate system and camera coordinate system match to a viewing state. A position of the detected object estimated from the detected region set is expressed by a translation vector $T_k$ and orientation vector $\Theta_k=B_kN_k$ where $N_k$ is a single rotation axis, $B_k$ is a single rotation angle, and $N_k$ is a normalized vector of a length "1" expressed by $N_k=[n_X, n_Y, n_Z]^T$. At this time, letting $R_k$ be a rotational transform obtained based on $N_k$ and $B_k$, an arbitrary point $P^m$ on the model moves to a position P' by the aforementioned position/orientation parameters $T_k$, $N_k$, and $B_k$. The position P' is given by:

$$P' = R_k P^m + T_k \tag{2}$$

Let $k1, \ldots, ku, \ldots, k^{Mk}$ be specific regions which construct a detected region set k where $M^k$ is the number of specific regions which construct the region set k, and when the region set is defined as, for example, a triplet, $M^k=3$. A position/orientation estimation problem of the detected region set k is a minimization problem of a function given by:

$$E = \sum_{u=1}^{M_k} \|P'_{ku} - P_{ku}\|^2 \tag{3}$$

where $P_{ku}$ is a camera coordinate system detected position (detected position information with reference to the coordinate system of the image capturing apparatus) of a specific region ku in the detected region set k, and $P'_{ku}$ is a camera coordinate system position after transform when a model coordinate position (coordinate position information of the 3D model of the target object) $P^m_{ku}$ of the specific region ku is transformed according to equation (4). Let $q=(q0, q1, q2, q3)$ and $T_k=[q4, q5, q6]^T$ be elements of a quaternion representation q of the rotational transform $R_k$ and the translation $T_k$. At this time, a detected position barycenter μ of the respective detected regions of the detected region set k and a position μ' after movement of the specific region barycenter of a region set t are respectively obtained by:

$$\mu = \frac{1}{M_k} \sum_{u=1}^{M_k} P_{ku} \tag{4}$$

$$\mu' = \frac{1}{M_k} \sum_{u=1}^{M_k} P'_{ku} \tag{5}$$

A covariance matrix $S_k$ of the specific region positions of the region set t and the detected region positions of the detected region set k are calculated like:

$$S_k = \frac{1}{M_k} \sum_{u=1}^{M_k} [(P_{ku} - \mu)(P'_{ku} - \mu')] \quad (6)$$

In this case, letting $A_{ij} = (S_k - S_k^T)_{ij}$ be a cyclic element of $S_k$, a column vector $\Delta = [A_{23}, A_{31}, A_{12}]^T$ is defined. It is known in non-patent literature 1 (P. J. Besl and N. D. McKay, "A Method for Registration of 3-D Shapes", IEEE Trans. PAMI, Vol. 14, No. 2, 1992.) that an eigenvalue vector corresponding to a maximum eigenvalue obtained by eigenvalue analysis of a symmetric matrix $Q(S_k)$, which is expressed using the element and vector, corresponds to an optimal solution of an element sequence $(q_0, q_1, q_2, q_3)$ of the quaternion representation q of the rotational transform R. The symmetric matrix $Q(S_k)$ is expressed by:

$$Q(S_k) = \begin{bmatrix} tr(S_k) & \Delta^T \\ \Delta & S_k + S_K^T - tr(S_k)I_{3\times 3} \end{bmatrix} \quad (7)$$

where $I_{3\times 3}$ is a 3×3 unit matrix.

The quaternion q as the quaternion representation of the rotational transform R allows to calculate the values of $N_k$ and $B_k$ since the single rotation axis $N_k$ and single rotation angle $B_k$ have relations given by:

$$q_0 = \cos\left(\frac{B_k}{2}\right) \quad (8)$$

$$q_1 = n_k^X \sin\left(\frac{B_k}{2}\right)$$

$$q_2 = n_k^Y \sin\left(\frac{B_k}{2}\right)$$

$$q_3 = n_k^Z \sin\left(\frac{B_k}{2}\right)$$

Also, an optimal solution of the translation vector $T_k$ which represents the position of the detection target object in the detected region set k is obtained like:

$$T_k = \mu - R\mu^m \quad (9)$$

where $\mu^m$ is obtained by rotational transforming the barycenter of the model coordinate positions of the specific regions which construct the detected region set k, and is obtained like:

$$\mu^m = \frac{1}{M_k} \sum_{u=1}^{M_k} P_{ku}^m \quad (10)$$

In the voting step S1050, votes are cast to vote spaces of a position and orientation with respect to the obtained estimated orientations in the respective detected region sets. This step executes calculation processing for multiplying vote values of positions and orientations output from the specific region detectors by vote weights settled in a convergence judgment step S2470 in FIG. 7B (to be described later) with respect to the positions and estimated orientations of the region sets estimated in the region set estimation step S1040. The respective detected region sets k are assigned vote weights $w_k(\Theta_k)$ decided by their detected orientations $\Theta_k$, and upon counting vote values from the region sets k, they are multiplied by the vote weights $w_k(\Theta_k)$. The vote weights are decided in the learning processing (to be described later).

Some voting methods are available. For example, a method of dividing vote spaces associated with a position parameter P and orientation parameter $\Theta$ into bins at predetermined intervals, and casting a vote to a bin including the estimated position/orientation parameters $P_k$ and $\Theta_k$ obtained in the region set estimation step S1040 may be used. Alternatively, a method of executing probability voting obtained by a Gaussian approximation having estimated position/orientation parameters $P_k$ and $\Theta_k$ with respect to parameter spaces associated with the position parameter P and orientation parameter $\Theta$ may be used. The numbers of votes to the bins of the position P and orientation $\Theta$ or accumulated probabilities of probability vote values of the respective region sets are calculated, and let $Pr(P, \Theta)$ be a position/orientation accumulated vote value of the detected object at the position P and orientation $\Theta$.

In the target object estimation step S1060, accumulated vote values (position/orientation accumulated vote values) of positions and orientations obtained by adding values obtained by multiplying position and orientation vote values by the vote weights in the calculation processing in the voting step S1050 in association with all the region sets are calculated. Then, a position and orientation where the accumulated vote value (position/orientation accumulated vote value) calculated by the addition becomes maximal are calculated. When the accumulated vote value at the position and orientation where the accumulated vote value (position/orientation accumulated vote value) becomes maximal is equal to or larger than a predetermined threshold, those position and orientation are estimated as those of the target object. In this step, estimated values of the position and orientation of the detected object are calculated from the position/orientation accumulated vote values $Pr(P, \Theta)$ as count results of the votes from the region sets. More specifically, a position P and orientation $\Theta$ corresponding to maximal $Pr(P, \Theta)$ are calculated, and when the value of $Pr(P, \Theta)$ at that time is equal to or larger than a threshold $\eta$, those position P and orientation $\Theta$ are determined as the estimated position and orientation of the target object to be recognized. The threshold $\eta$ is a lower limit value associated with position/orientation accumulated vote value $Pr(P, \Theta)$. For example, the threshold $\eta$ is set like $\eta = 0.9$.

As the recognition processing, the processing for estimating the position and orientation of a 3D object by units of voting has been explained. Upon execution of such processing, a problem of how to effectively define vote weights of region sets used in position/orientation estimation is posed. Especially, in region set detection at an arbitrary orientation, detection difficulty for an identical region set changes depending on viewing angles. This embodiment provides a method of setting vote weights of region sets, which is effective to solve this problem, and that learning method will be described below.

Processing of the learning method according to this embodiment will be described below with reference to FIG. 7A. In a learning data collection step S2100 in FIG. 7A, learning images $I^v$ and camera coordinate system maps $Xmap^v$, $Ymap^v$, and $Zmap^v$ as pieces of target object information obtained from a plurality of viewpoints $v=1, \ldots, V$ associated with the target object are acquired as data used in learning. The camera and distance measurement in acquisition of these pieces of target object information desirably have the same settings as those in the detection processing, but they need not always have the same settings. For example, pieces of target object information at various viewpoints may be used as the learning images $I^v$ and camera coordinate system maps $Xmap^v$, $Ymap^v$, and $Zmap^v$ by creating their images and 3D information based on a 3D model by, for example, computer graphics.

Figure 8:
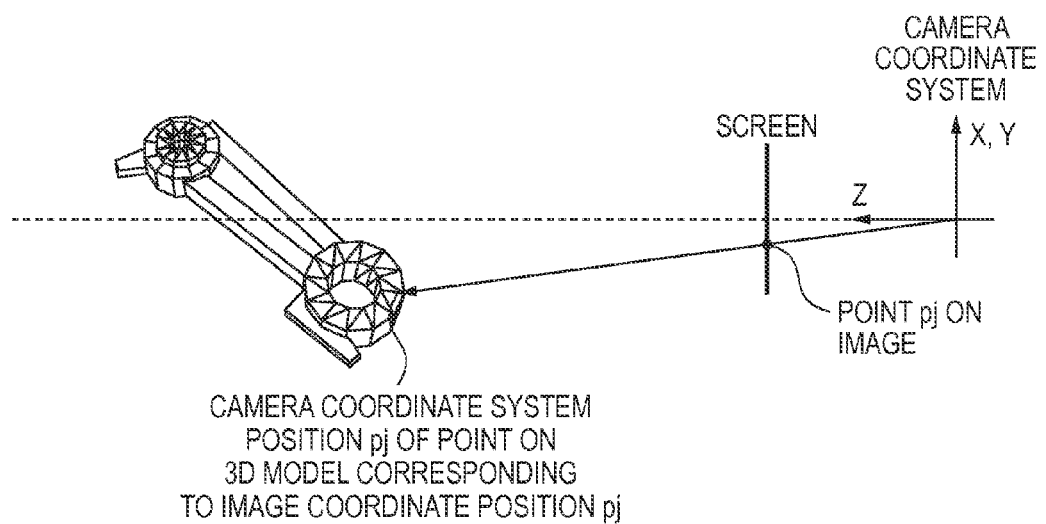
FIG. 8 is a view showing the relationship between a point on a 3D model and image coordinates.

In a coordinate correspondence calculation step S2200, the coordinate correspondence calculation unit 400 acquires a 3D model of the target object from the 3D model storage unit 600. The coordinate correspondence calculation unit 400 receives captured image data (learning images) from the image capturing unit 300, and calculates correspondence relationships between the captured image data (learning images) and respective points on the 3D model. A position and orientation on the camera coordinate system of the target object in each learning image are calculated manually or matching processing using a tracking tool and the like based on a state-of-the-art technique. As a result, since the position and orientation on the camera coordinate system of the target object in each learning image are calculated, a target object region on that image can be obtained by perspective projection. As shown in FIG. 8, camera coordinate system positions $P_j$ of points on the 3D model corresponding to respective image coordinate points $p_j$ on the target object region are obtained. The coordinate correspondence calculation unit 400 calculates all corresponding relationships between camera coordinate points and image coordinate points in target object regions on the respective learning images $I^v$, and sends them to the learning apparatus 200. Also, the coordinate correspondence calculation unit 400 sends rotational axis unit vectors $n^v$ and rotation angles $\beta^v$ as orientation parameters based on a single rotation representation of the target object, and translation vectors $P_c^v$ indicating object positions, which are obtained upon calculation (matching) of the correspondence relationships, together to the learning apparatus 200. Assume that learning data $S=\{I^v, Xmap^v, Ymap^v, Zmap^v, n^v, \beta^v, P_c^v\}$ summarize these pieces of information in association with all the viewpoints $v=1, \ldots, V$. Note that when learning data are artificially generated from a 3D model and positions and orientations of an object at respective viewpoints are given, the need for the matching processing can be obviated.

Figure 9A:
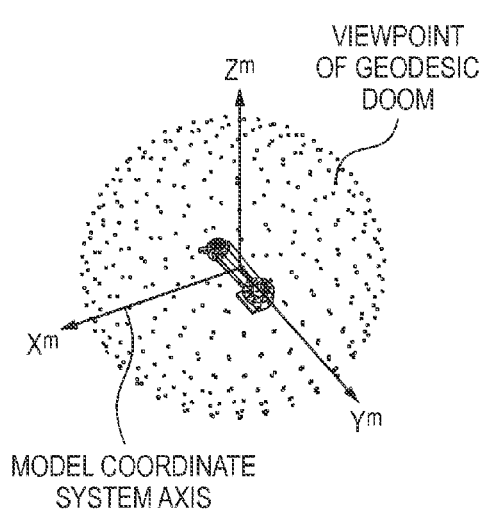
FIGS. 9A and 9B are views for explaining viewpoints of a geodesic doom associated with learning data acquisition.
Figure 9B:
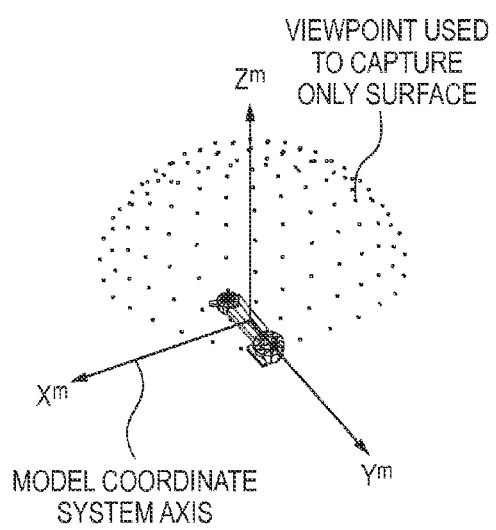

In a learning data division step S2300, the learning data from the plurality of viewpoints $v=1, \ldots, V$ obtained in the learning data collection step S2100 and coordinate correspondence calculation step S2200 are divided into specific region detector learning data and evaluation data. Viewpoint indices v for respective data are reassigned like $v_L=1, \ldots, V_L$, and $v_W=1, \ldots, V_W$. The learning images $I^v$, camera coordinate system maps $Xmap^v$, $Ymap^v$, and $Zmap^v$, and the position/orientation parameters $n^v$, $\beta^v$, and $P_c^v$ of the object in the respective data are divided into two groups. That is, specific region detector learning data include specific region detector learning data $S_L=\{I^{v_L}, Xmap^{v_L}, Ymap^{v_L}, Zmap^{v_L}, n^{v_L}, \beta^{v_L}, P_c^{v_L}\}$. Also, evaluation data include evaluation data $S_W=\{I^{v_W}, Xmap^{v_W}, Ymap^{v_W}, Zmap^{v_W}, n^{v_W}, \beta^{v_W}, P_c^{v_W}\}$. In this case, in the two divided groups, data may be divided to overlap each other or not to overlap each other, and the present invention is not limited by a degree of overlapping of data. When the orientation estimation performance based on the learning results is not biased to viewpoints, it is desirable to approximate a viewpoint distribution of each of the specific region detector learning data $S_L$ and evaluation data $S_W$ by a geodesic doom, as shown in FIG. 9A, so as to be less biased. The geodesic doom is a state-of-the-art method, which evenly discretization-expresses a spherical plane by recursively dividing each triangular surface element of a regular polyhedron into triangles having the same area. However, when a prior distribution associated with an orientation based on layout conditions of the detection target object is given, learning data may be prepared at a viewpoint density according to that distribution. For example, if an object which is understood to always be supplied with the obverse side facing up is used as a detection target of detectors, only data associated with the obverse side may be collected and used, as shown in FIG. 9B. The learning method of the learning apparatus 200 using these data will be explained in the following learning step S2400.

FIG. 7B shows the contents of the detailed processing in the processing sequence of the learning step S2400. In a specific region initial selection step S2410, $N_0$ points or partial regions are randomly selected from a given 3D model surface of the target object, and are used as initial selected regions (selected specific regions). The number $N_0$ of selected regions is set to be, for example, $N_0=200$. The value of $N_0$ is not limited to this example, and an arbitrary natural number can be set.

Next, in a specific region detector learning step S2420, detectors of the selected $N_0$ specific regions are learned. Learning data used to learn the detectors used to detect the specific regions selected in the specific region initial selection step S2410 are generated, and detectors are generated by learning using the learning data. FIG. 7C shows the sequence of details of the specific region detector learning step S2420. In a selected region model coordinate transform step S2421, a coordinate value of a selected region a on the model coordinate system is calculated. Assume that an image coordinate system position of the selected region $\underline{a}$ on an evaluation image $I^v$ at a viewpoint v is $p_a^v=[x_a, y_a]^T$. A camera coordinate system position of that position can be obtained as $P_a^v=[Xmap^v(p_a^v), Ymap^v(p_a^v), Zmap^v(p_a^v)]$. Then, a model coordinate system position $P_a^m$ can be calculated from the position/orientation parameters $n^v$, $\beta^v$, and $P_a^v$, as shown in FIG. 11.

$$P_a^m = R(n^{v_w}, \beta^{v_w})^{-1}(P_a^{v_w} - P_c^{v_W}) \quad (11)$$

where $R(n^v, \beta^v)$ is a rotational transform matrix based on the single rotation axis $n^v$ and single rotation angle $\beta^v$. In association with the model coordinate system position $P_a^m$ of the selected region $\underline{a}$ obtained in this way, in a selected region camera coordinate transform step S2422, camera coordinate system positions $P_a^{v_L}$ of the specific region detector learning data $S_L$ at respective viewpoints $v_L$ are calculated.

$$P_a^L = R(n^{v_L}, \beta^{v_L}) P_a^m + P_c^{v_L} \quad (12)$$

In a selected region image coordinate transform step S2423, the camera coordinate system positions $P_a^{v_L}$ are further transformed into image coordinate system positions $p_a^{v_L}$ using camera parameters at the time of learning data acquisition.

$$p_a^{V_L} = \begin{bmatrix} x_a^{v_L} \\ y_a^{v_L} \end{bmatrix} = \frac{f}{Z_a^{v_L} \delta} \begin{bmatrix} X_a^{v_L} \\ Y_a^{v_L} \end{bmatrix} \quad (13)$$

where $\delta$ and f are the aforementioned camera parameters, that is, $\delta$ is the pixel size of the camera, and f is the camera focal length. In a selected region visible determination step S2424, $Z_a^{v_L}$ and $Zmap^{v_L}(p_a^{v_L})$ values are compared, and if $Z_a^{v_L} > Zmap^{v_L}(p_a^{v_L})$, it is judged that the selected region $\underline{a}$ is invisible from a viewpoint $v_L$. In this manner, whether or not selected regions are visible is determined in association with all viewpoints of the specific region detector learning data $S_L$.

In a selected region feature amount extraction step S2425, partial images having the image coordinate system positions $p_a^{v_L}$ as the centers are extracted from the visible viewpoints $v_L$ by the same method as in the processing at the time of detection to extract feature amounts, and are used as data required to learn specific region detectors. When feature amounts used are not rotation invariable feature amounts, extracted partial images may be rotated in plane, and may be added to data as those at the time of in-plane rotation.

In a learning calculation step S2426, data used to learn specific region detectors are generated by the aforementioned processing in association with the selected $N_O$ specific regions, and detectors (specific region detectors) associated with the respective specific regions are generated using these data. As for the specific region detectors, arbitrary given methods may be used. For example, identifiers in SVM (Support Vector Machine) or Randomized Tree as a state-of-the-art technique may be used. The specific region detectors may be learned as multi-class classifiers which classify respective regions as different classes. Furthermore, as other detectors, for example, using One-Class SVM as a state-of-the-art technique, detectors may be learned in association with respective specific regions to generate detectors as many as the number of specific regions.

Referring back to FIG. 7B, after the specific region detectors are obtained in the specific region detector learning step S2420, a plurality of region set candidates as combinations of selected regions are generated in a region set generation step S2430. For example, a region set is generated by combining specific regions within a predetermined distance range of the plurality of specific regions selected in the specific region initial selection step S2410. If a region set is constructed as a triplet using three regions, there are a total of $_{N0}C_3$ region set candidates for the number $N_0$ of selected regions. However, using the above visible determination results, a combination of regions which are not visible at the same time can be excluded in advance from region set candidates. All combinations of visible regions need not always be generated, and region sets may be narrowed down by, for example, not using a combination of specific regions on an identical line, and avoiding overlaps of ridges by Delauney triangulation.

In an evaluation step S2440, positions and orientations of the region sets are recognized using the specific region detectors generated by learning. 3D position/orientation estimation is executed using, as input data, data at all the viewpoints of the evaluation data $S_W$ by the recognition processing in steps S1010 to S1060 described above. Before execution of a normalization step S2450 (to be described later), all vote weights used in the aforementioned voting step S1050 are initialized to a given value (for example, 1). When the position/orientation estimation result of the target object can be obtained as an evaluation result within a predetermined error range, it is determined that a correct recognition result can be obtained. Even when the position/orientation estimation result is obtained, if it falls outside the predetermined error range, it is determined that an erroneous recognition result is obtained; when no position/orientation estimation result is obtained, it is determined that no result is detected, and an erroneous recognition result is obtained. The position/orientation estimation results at all the viewpoints $v_W$ of the evaluation data $S_W$ and the detection results of the region sets are held.

Figure 10B:
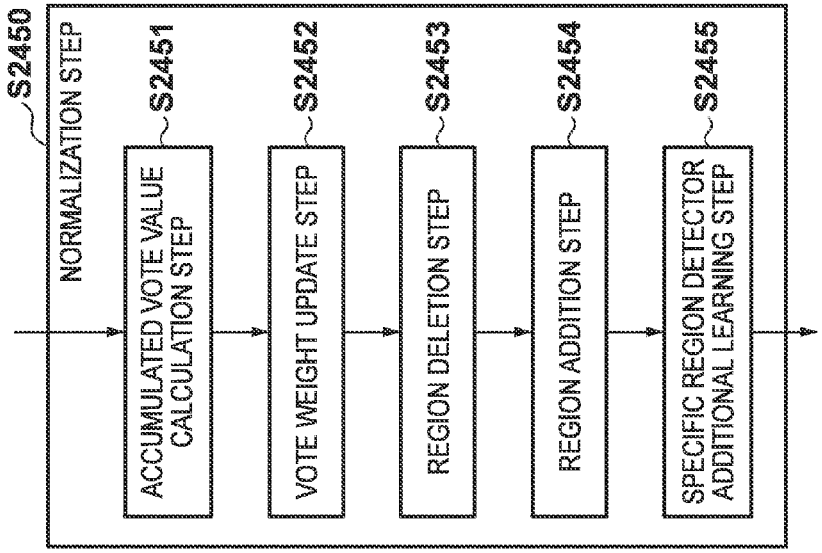
FIGS. 10A and 10B are flowcharts for explaining the sequence of normalization processing according to the first and second embodiments.
Figure 10A:
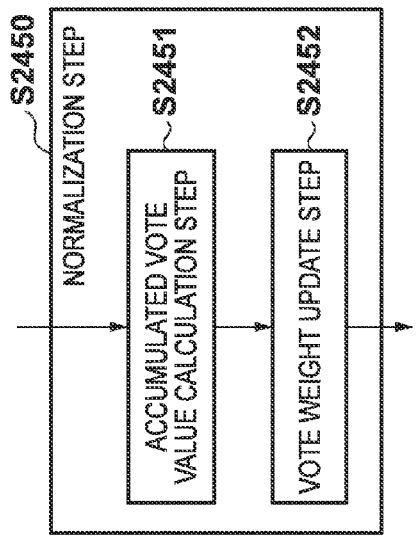

In the normalization step S2450, vote weights for detector outputs are set according to position/orientation recognition accuracies of the region sets required by the recognition results based on the recognition results in the evaluation step S2440. That is, in this step, vote weights $w_t(\Theta_t)$ used in the aforementioned voting step S1050 are normalized. FIG. 10A shows the detailed sequence associated with processing in the normalization step S2450 according to this embodiment.

In an accumulated vote value calculation step S2451, two types of accumulated vote values at all the viewpoints $v_W$ are calculated as recognition accuracies based on the region set detection results obtained in the evaluation step S2440. As one type, accumulated values (true-detection accumulated vote values) $ET(v_W)$ of vote values of region sets normally detected at detection accuracies within a predetermined error range are calculated, and are defined from accumulated vote values for positions and orientations as correct solution values as follows:

$$ET(v_W) = \sum_{k \in K} w_k(\Theta_k) Pr_k^{v_W} \quad (14)$$

In this case, for the purpose of a simple description, equation (14) is expressed like:

$$Pr_k^{v_W} \equiv Pr_k(P_{v_W}, \Theta_{v_W}) \quad (15)$$

where K is a set of detected region sets at a viewpoint $v_W$, $\Theta_k$ is an estimated orientation of a detected region set k at that viewpoint. $P_{v_W}$ and $\Theta_{v_W}$ are true values associated with the position and orientation of the target object at that viewpoint obtained in the coordinate correspondence calculation step S2200. $Pr_k(P, \Theta)$ is an weight-less vote value for the position P and orientation $\Theta$ of the detected region set k. As the other type, accumulated values (false-detection accumulated vote values) $EF_j(v_W)$ of vote weight values of region sets, which are erroneously detected beyond an error range, are calculated, and are defined from accumulated vote values associated with erroneously detected positions as follows:

$$EF_j(v_W) = \sum_{k \in K} w_k(\Theta_k) Pr_k^j \quad (16)$$

In this case, for the purpose of a simple description, equation (16) is expressed like:

$$Pr_k^j = Pr_k(P_j, \Theta_j) \quad (17)$$

where $j = N_{v_W}^F$ is an index of the target object erroneously detected at a viewpoint $v_W$, and $N_{v_W}^F$ is the number of detection errors which have occurred at that viewpoint. $P_j$ and $\Theta_j$ are estimated positions and estimated orientations obtained in the erroneous detection j.

In a vote weight update step S2452, weights of vote values are updated based on the calculated accumulated vote values. Vote weight values have to assume values so that the true-detection accumulated vote values $ET(v_W)$ are equal to or larger than a vote threshold ($\eta$: a vote threshold), and the false-detection accumulated vote values $EF_j(v_W)$ are less than the vote threshold. If optimization of the true-detection accumulated vote values $ET(v_W)$ is to be solved by a steepest descent method, from partial differentials associated with $w_k(\Theta_k)$ in equation (14), an update formula of the vote weights $w_k(\Theta_k)$ can be obtained as follows:

$$\Delta w_k(\Theta_k) = \zeta_T \delta \frac{\partial ET(v_W)}{\partial w_k(\Theta_k)} = \zeta_T \delta Pr_k^{v_W} \quad (18)$$

where $\zeta_T$ is a learning coefficient, which is set to be, for example, $\zeta_T = 0.2$. Also, $\delta$ is a delta function used to decide whether or not to update a weighting coefficient. For example, if a restraint that a maximum value of vote weights is suppressed to, for example, 0.3 is added, the delta function can be defined like:

$$\delta = \begin{cases} 0 & \text{if } w_k(\Theta_k) \geq 0.3 \\ 1 & \text{otherwise} \end{cases} \quad (19)$$

Alternatively, if a restraint that a weighting coefficient is not updated when the region sets of the target object have already been correctly detected, the delta function can be defined like:

$$\delta_{v_W} = \begin{cases} 0 & \text{if } ET(v_w) \geq \eta \\ 1 & \text{otherwise} \end{cases} \quad (20)$$

If optimization of the false-detection accumulated vote values $EF_j(v_W)$ is to be solved by a steepest descent method, from partial differentials of $w_k(\Theta_k)$ in equation (16), an update formula of the vote weights $w_k(\Theta_k)$ can be obtained like:

$$\Delta w_k(\Theta_k) = -\zeta_F \frac{\partial EF_j(v_W)}{\partial w_k(\Theta_k)} = -\zeta_F Pr_k^j \quad (21)$$

where $\zeta_F$ is a learning coefficient, which is set to be, for example, $\zeta_F=0.1$. By applying equations (20) and (21) above, the vote weights are updated. The vote weights $w_k(\Theta)$ may be held in the form of an LUT (lookup table) of quantized $\Theta$, or as a function of $\Theta$, which is obtained by polynomial approximation.

Referring back to FIG. 7B, if the vote weights before update (already set vote weights) and those after update (vote weights newly set in the normalization step S2450) remain unchanged as an application result of the update processing of the vote weights in association with all the viewpoints $v_W$ of the evaluation data $S_W$, it is judged that the processing is converged (YES in S2470). For example, if differences between the already set vote weights and newly calculated vote weights exceed a predetermined threshold (NO in S2470), the processes in the evaluation step (S2440) and normalization step (S2450) are repetitively executed. On the other hand, if the differences between the already set vote weights and newly calculated vote weights fall within the predetermined threshold range, it is judged that the vote weights remain unchanged and the processing is converged, and these vote weights are settled (YES in S2470). Then, the vote weights are stored in the learning result storage unit 700, thus ending the learning processing. On the other hand, if the vote weights are changed, it is judged that the processing is not converged, and the process returns to the evaluation step S2440 to execute the processes of the evaluation step and normalization step again using the newly set and updated vote weights.

With the aforementioned learning method, the vote weights are normalized according to the recognition accuracies of the positions and orientations of the region sets. At an orientation, which is easy to be detected with a high accuracy, a corresponding region set is strongly voted. At an orientation with a lower recognition accuracy, a corresponding region set is voted weakly compared to votes from a region set of an orientation with a high reliability. Hence, detection errors are hard to occur, thus improving the recognition accuracy of the target object.

Second Embodiment

This embodiment will explain a method of further executing deletion of unnecessary region sets and addition of short specific regions for the learning method described in the first embodiment. The sequence of the learning processing is as shown in FIG. 7A. In the learning data collection step S2100, coordinate correspondence calculation step S2200, and learning data division step S2300, the same processes as those in the first embodiment are executed to generate specific region detector learning data $S_L$ and evaluation data $S_W$.

The detailed sequence of the learning step S2400 in this embodiment will be described below with reference to FIG. 7B. From the specific region initial selection step S2410 to the evaluation step S2440, the same processes as those in the first embodiment are executed. In the specific region initial selection step S2410, $N_0$ specific regions are selected as the initial number of specific regions. The initial number $N_0$ of specific regions need not assume a large value, and a small value, for example, $N_0=10$, may be set. In the specific region detector learning step S2420, detectors of the specific regions are learned. In the region set generation step S2430, region set candidates as combinations of the selected regions are generated. Then, in the evaluation step S2440, 3D position/orientation estimation is executed in association with all viewpoints of the evaluation data $S_W$.

In the normalization step S2450, vote weights are normalized, and deletion of unnecessary region sets and addition of short specific regions are executed. FIG. 10B shows the detailed sequence associated with processing in the normalization step S2450 of this embodiment. In the detailed sequence shown in FIG. 10B, in the accumulated vote value calculation step S2451 and vote weight update step S2452, the same processes as those in the respective steps in FIG. 10A are executed to update vote weights.

In a region deletion step S2453, unnecessary region sets and specific regions are deleted. In association with respective region sets, if a maximum value of the vote weights updated in the vote weight update step S2452 is less than a predetermined threshold, a corresponding region set is deleted. Letting $w'_k(\Theta)$ be a region set effectiveness of each region set k, a maximum value of vote weights at all orientations is calculated by:

$$w'_k = \max_{\Theta} w_k(\Theta) \quad (22)$$

If the value of the region set effectiveness $w'_k(\Theta)$ is less than a predetermined threshold close to zero, for example, it is less than 0.1, it is judged that the region set k is unnecessary since it has a low degree of contribution to votes, and the region set k is deleted from the selected region sets. After all the unnecessary region sets are deleted, a specific region which belongs to a deleted region set as its element is deleted from the selected specific regions. The region set effectiveness $w'_k(\Theta)$ is not limited to the maximum value of all the orientations, but may be set using an average value, median, or the like.

In a region addition step S2454, if the evaluation results obtained in the evaluation step S2440 include viewpoints at which positions and orientations of region sets of the target object are not detected, it is judged that specific regions and region sets are short, and new specific regions are added. Using added specific regions, new region sets are added. A viewpoint $v_{FN}$ is arbitrarily selected from viewpoints in the evaluation data $S_W$ at which positions and orientations are not detected, an additional specific region is selected from a target object surface visible from the viewpoint $v_{FN}$, and is added to the selected specific regions. As for the selection method, a viewpoint may be randomly selected, or may be selected from an image region to which a specific region detector does not undergo reaction based on the detection results of the already selected specific regions. One or more specific regions are to be added, a plurality of specific regions may be added at the same time, and a plurality of viewpoints $v_{FN}$ may be selected. From combinations of the newly added selected specific regions and the selected specific regions which are left without being deleted, region sets are generated by the same process as in the region set generation step S2430, and are added to the selected region sets, thus generating new selected region sets. Vote weights of the newly generated selected region sets are initialized by, for example, an average value of vote weights of other region sets.

Next, in a specific region detector additional learning step S2455, specific region detectors are learned as well as the specific regions added in the region addition step S2454. Feature amounts of the added specific regions are extracted by the same process as in the specific region detector learning step S2420 and are added to data required to learn specific region detectors, and detectors associated with respective specific regions are learned, thereby generating specific region detectors.

Referring back to FIG. 7B, if the vote weights, selected specific regions, and selected region sets remain unchanged as a result of the process in the normalization step S2450, it is judged that the processing is converged (YES in S2470). Then, the vote weights, selected specific regions, and selected region sets are stored in the learning result storage unit 700, thus ending the learning processing. Otherwise, it is judged that the processing is not converged (NO in S2470), and the process returns to the evaluation step S2440 to execute the evaluation process again.

With the aforementioned learning method, the vote weights are normalized according to the recognition accuracies of the positions and orientations of the region sets, and the selected specific regions and selected region sets are adjusted according to their effectiveness. For this reason, only the necessary specific regions and region sets are selected, and weighted voting in consideration of reliabilities based on the orientations of the detected region sets is executed, thus improving the recognition accuracy of the target object.

Third Embodiment

This embodiment will explain a method of updating specific regions that construct each region set so as to improve a detection result in association with region sets which are required in the recognition processing described in the first embodiment. The sequence of the learning processing is as shown in FIG. 7A. In the learning data collection step S2100, coordinate correspondence calculation step S2200, and learning data division step S2300, the same processes as those in the first embodiment are executed to generate specific region detector learning data $S_L$ and evaluation data $S_W$.

Figure 12A:
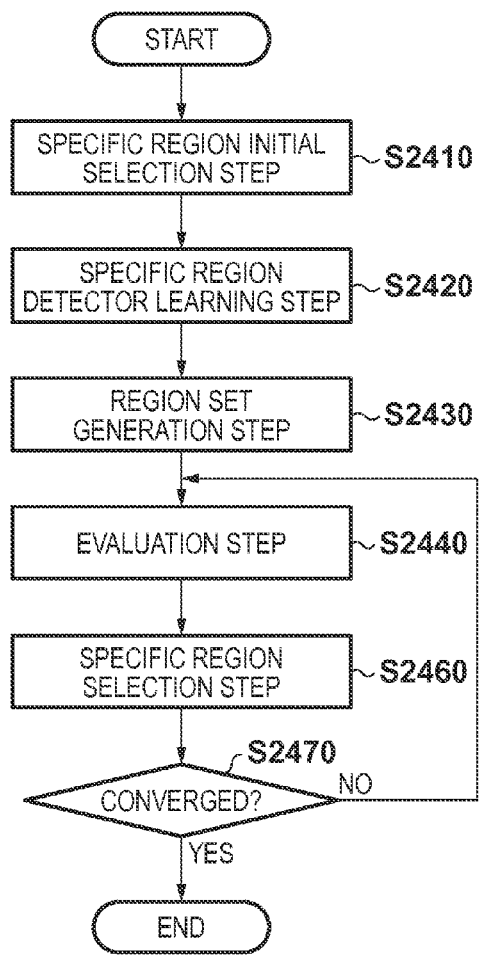
FIGS. 12A and 12B are flowcharts for explaining the sequence of a learning method according to the third embodiment.

The detailed sequence of the learning step S2400 in this embodiment will be described below with reference to FIG. 12A. In FIG. 12A, from the specific region initial selection step S2410 to the evaluation step S2440, the same processes as those in the first embodiment are executed. In the specific region initial selection step S2410, $N_0$ specific regions are selected as the initial number of specific regions. In the specific region detector learning step S2420, detectors of the specific regions are learned. In the region set generation step S2430, region set candidates as combinations of the selected regions are generated. Then, in the evaluation step S2440, 3D position/orientation estimation is executed in association with all viewpoints of the evaluation data $S_W$.

Figure 12B:
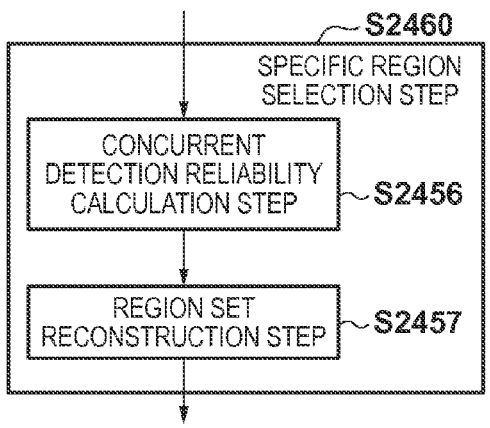

In a specific region selection step S2460, specific regions which construct each region set are selected according to a concurrent detection rate of region sets. FIG. 12B shows the detailed sequence associated with processing in the specific region selection step S2460.

In a concurrent detection rate calculation step S2456 in FIG. 12B, a concurrent detection rate, at which a plurality of region sets are concurrently detected as positions and orientations, which fall within a predetermined error range, at an identical image capturing position of the detection results upon capturing a plurality of region sets from a plurality of image capturing positions of the image capturing unit, is calculated. A concurrent true voting contribution rate $RT_S(k, l)$ at which region sets k and l concurrently contribute to voting to a right position and orientation at an identical viewpoint (identical image capturing position) is defined as follows:

$$RT_S(k, l) = \frac{1}{V_W} \sum_{v_W} Pr_k^{v_W} Pr_l^{v_W} \quad (23)$$

In this case, for the purpose of a simple description, equation (23) is expressed like:

$$Pr_k^{v_W} = Pr_k(P_{v_W}, \Theta_{v_W}), Pr_l^{v_W} = Pr_l(P_{v_W}, \Theta_{v_W}) \quad (24)$$

where $P_{v_W}$ and $\Theta_{v_W}$ are true values associated with a position and orientation of the target object at a viewpoint $v_W$ obtained in the coordinate correspondence calculation step S2200, and $V_W$ is the total number of viewpoints in the evaluation data $S_W$. $Pr_k(P, \Theta)$ is an weight-less vote value for a position P and orientation $\Theta$ of the detected region set k at that viewpoint. However, when the region set k cannot be detected at that viewpoint, we have $Pr_k(P, \Theta)=0$.

By contrast, an exclusive true voting contribution rate $RT_x(k, l)$ at which one of the region sets k and l contributes to voting a right position and orientation is defined by:

$$RT_X(k, l) = \frac{1}{V_W} \sum_{v_W} Pr_k^{v_W}\{1 - Pr_l^{v_W}\} + Pr_l^{v_W}\{1 - Pr_k^{v_W}\} \quad (25)$$

$$= \frac{1}{V_W} \sum_{v_W} \{Pr_k^{v_W} + Pr_l^{v_W} - 2Pr_k^{v_W} Pr_l^{v_W}\}$$

In this case, a concurrent true detection rate $RT(k, l)$ of the region sets k and l is defined by:

$$RT(k, l) = \frac{RT_S(k, l)}{RT_X(k, l)} \quad (26)$$

Likewise, a concurrent false voting contribution rate $RF_S(k, l)$ at which the region sets k and l concurrently vote to an erroneously detected position and orientation at an identical viewpoint is calculated by:

$$RF_S(k, l) = \frac{1}{V_W} \sum_{v_W} \sum_j^{N_{v_W}^F} Pr_{kj}^{v_W} Pr_{lj}^{v_W} \quad (27)$$

Also, an exclusive false voting contribution rate $RF_x(k, l)$ at which one of the region sets k and l votes to an erroneously detected position and orientation is calculated by:

$$RF_X(k, l) = \frac{1}{V_W} \sum_{v_W} \sum_j^{N_{v_W}^F} \{Pr_{kj}^{v_W} + Pr_{lj}^{v_W} - 2Pr_{kj}^{v_W} Pr_{lj}^{v_W}\} \quad (28)$$

In this case, for the purpose of a simple description, equations (27) and (28) are expressed like:

$$Pr_{kj}^{v_W} = Pr_k(X_j^{v_W}, \Theta_j^{v_W}), Pr_{lj}^{v_W} = Pr_l(X_j^{v_W}, \Theta_j^{v_W}) \quad (29)$$

A concurrent false detection rate $RF(k, l)$ of the region sets k and l is defined by:

$$RF(k, l) = \frac{RF_S(k, l)}{RF_X(k, l)} \quad (30)$$

A ratio between the concurrent true detection rate $RT(k, l)$ and concurrent false detection rate $RF(k, l)$ is defined as a concurrent detection rate $R(k, l)$ of the region sets k and l:

$$R(k, l) = \frac{RT(k, l)}{RF(k, l)} \quad (31)$$

The concurrent detection rate $R(k, l)$ may be calculated for all the region sets k and l. However, since calculation cost becomes high in terms of combinations, the concurrent detection rate $R(k, l)$ may be calculated by limiting to some viewpoints. For example, only viewpoints with large accumulated vote values to the right positions and orientations in the results in the evaluation step S2440 are selected, and the concurrent detection rates may be calculated in association with only the region sets detected at these viewpoints.

Figure 4C:
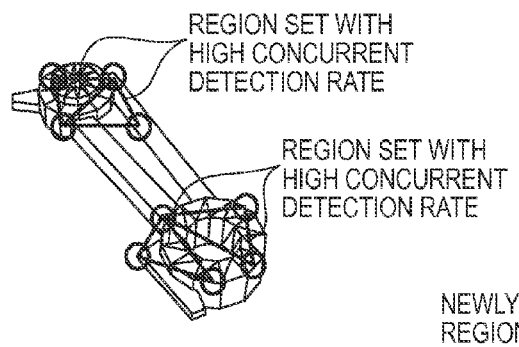
Figure 4D:
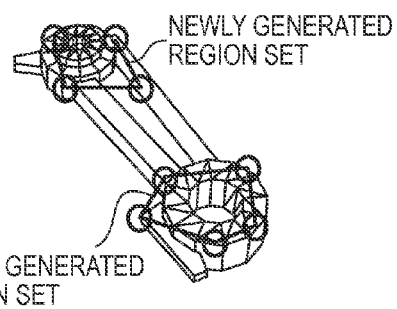

In a region set reconstruction step S2457, the selected region sets are updated based on the concurrent detection rates calculated in the above concurrent detection rate calculation step S2456. Specific regions which respectively construct a plurality of region sets having a concurrent detection rate, which is calculated in the concurrent detection rate calculation step S2456, and is larger than a predetermined threshold, are selected as those which construct one new region set. Then, a new region set is generated from the selected specific regions, and are added to the region sets generated in the region set generation step S2430. The region sets k and l having the concurrent detection rate $R(k, l)$, which is larger than the predetermined threshold, are more likely to be normally and concurrently detected at an identical viewpoint, and are hard to be erroneously detected. Specific regions which construct the region sets k and l are selected as those which construct one new region set to generate a new region set, and that new region set is added to the region sets. FIG. 4B shows an example of selected region sets, and FIG. 4C shows an example of newly generated region sets. The region sets k and l may be left intact, but since they are redundant region sets in terms of a computation volume, they are desirably deleted from the selected region sets. The threshold for the concurrent detection rate $R(k, l)$ required to generate a new region set may be a fixed threshold, or a top combination of a given ratio may be selected by a percentile method. Alternatively, only a combination which yields a highest value may be selected.

If the constructions of the region sets remain unchanged, it is judged that the processing is converged, and the selected region sets are stored in the learning result storage unit 700, thus ending the learning processing. If the constructions of the region sets have changed, it is judged that the processing is not converged (NO in S2470), and the process returns to the evaluation step S2440 to execute the evaluation process again. On the other hand, if the constructions of the region sets remain unchanged, it is judged that the processing is converged (YES in S2470), thus ending the processing.

With the aforementioned learning method, the region sets are reconstructed according to the concurrent detection rates of the region sets. Specific regions which are easy to be concurrently detected depending on viewpoints are included in the same region set. Therefore, occurrence of voting errors due to region sets constructed by fewer specific regions can be suppressed, thus improving the recognition accuracy of the target object.

Fourth Embodiment

This embodiment will explain a method for further setting vote weights for region sets for the learning method described in the third embodiment. The sequence of the learning processing is shown in FIG. 7A. In the learning data collection step S2100, coordinate correspondence calculation step S2200, and learning data division step S2300, the same processes as those in the first embodiment are executed to generate specific region detector learning data $S_L$ and evaluation data $S_W$.

Figure 13A:
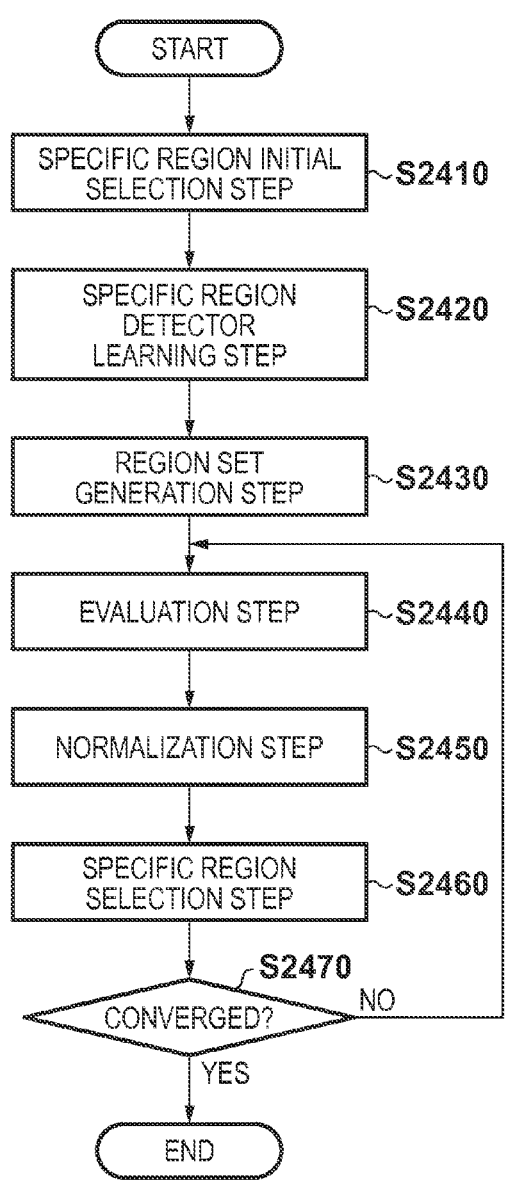
FIGS. 13A and 13B are flowcharts for explaining the sequence of a learning method according to the fourth embodiment.

The detailed sequence of the learning step S2400 in this embodiment will be described below with reference to FIG. 13A. In FIG. 13A, from the specific region initial selection step S2410 to the evaluation step S2440, the same processes as those in the first embodiment are executed. In the specific region initial selection step S2410, $N_0$ specific regions are selected as the initial number of specific regions. In the specific region detector learning step S2420, detectors of the specific regions are learned. In the region set generation step S2430, region set candidates as combinations of the selected regions are generated. Then, in the evaluation step S2440, 3D position/orientation estimation is executed in association with all viewpoints of the evaluation data $S_W$.

Figure 13B:
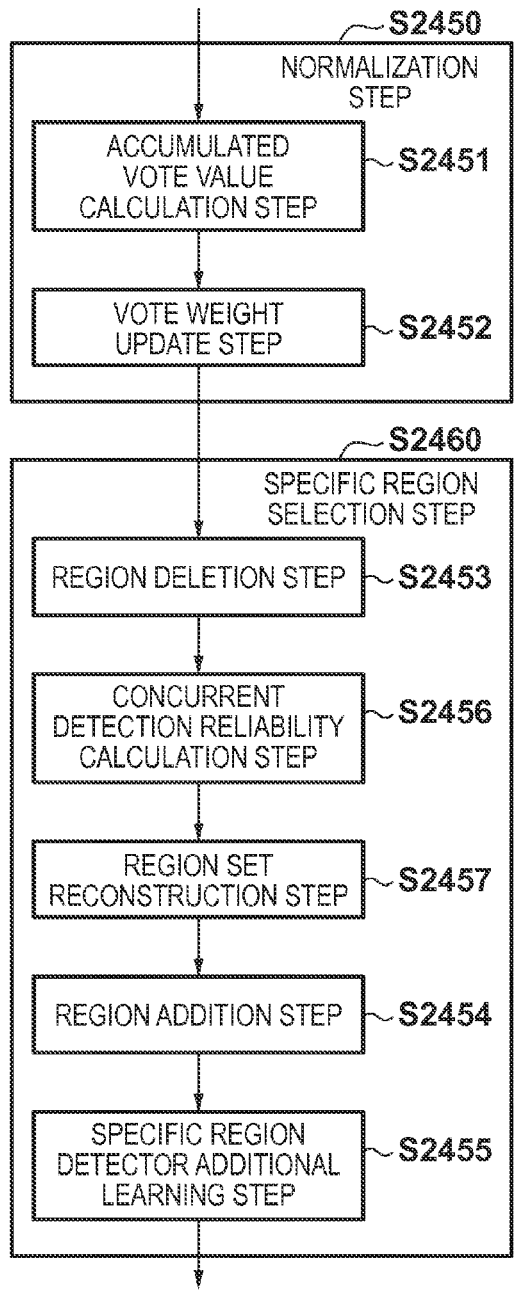

In the normalization step S2450, vote weights of the region sets are normalized. In the specific region selection step S2460, specific regions which construct region sets are selected according to concurrent detection rates. FIG. 13B shows the detailed sequence associated with processes in the normalization step S2450 and specific region selection step S2460 of this embodiment. In the accumulated vote value calculation step S2451 and vote weight update step S2452 in the normalization step S2450 in FIG. 13B, true-detection accumulated vote values $ET(v_W)$ and false-detection accumulated vote values $EF(v_W)$ are calculated in the same manner as in the first embodiment to update vote weights.

In the region deletion step S2453 of the specific region selection step S2460 in FIG. 13B, unnecessary specific regions and region sets are deleted in the same manner as in the second embodiment. In the concurrent detection rate calculation step S2456, concurrent detection rates are calculated in the same manner as in the third embodiment. However, the concurrent true voting contribution rate $RT_S(k, l)$, exclusive true voting contribution rate $RT_X(k, l)$, concurrent false voting contribution rate $RF_S(k, l)$, and concurrent false voting contribution rate $RF_S(k, l)$ are calculated in consideration of vote weights respectively by:

$$RT_S(k, l) = \frac{1}{V_W} \sum_{v_W} w_k(\Theta_k)w_l(\Theta_l)Pr_k^{vw} Pr_l^{vw} \quad (32)$$

$$RT_X(k, l) = \frac{1}{V_W} \sum_{v_W} \left\{ \begin{array}{l} w_k(\Theta_k)Pr_k^{vw} + w_l(\Theta_l)Pr_l^{vw} - \\ 2w_k(\Theta_k)w_l(\Theta_l)Pr_k^{vw} Pr_l^{vw} \end{array} \right\} \quad (33)$$

$$RF_S(k, l) = \frac{1}{V_W} \sum_{v_W} \sum_{j}^{N_{v_W}^F} w_k(\Theta_k)w_l(\Theta_l)Pr_{kj}^{vw} Pr_{lj}^{vw} \quad (34)$$

$$RF_X(k, l) = \frac{1}{V_W} \sum_{v_W} \sum_{j}^{N_{v_W}^F} \left\{ \begin{array}{l} w_k(\Theta_k)Pr_{kj}^{vw} + w_l(\Theta_l)Pr_{lj}^{vw} - \\ 2w_k(\Theta_k)w_l(\Theta_l)Pr_{kj}^{vw} Pr_{lj}^{vw} \end{array} \right\} \quad (35)$$

In the region set reconstruction step S2457, selected region sets are updated based on the concurrent detection rates in the same manner as in the third embodiment.

In the region addition step S2454 and specific region detector additional learning step S2455, addition of specific regions and region sets, and additional learning of specific region detectors as a result of addition are executed in the same manner as in the second embodiment.

If the vote weights, selected specific regions, and selected region sets remain unchanged as a result of the processes in the normalization step S2450 and specific region selection step S2460, it is judged that the processing is converged (YES in S2470). Then, the vote weights, selected specific regions, and selected region sets are stored in the learning result storage unit 700, thus ending the learning processing. On the other hand, if it is determined in the convergence judgment step S2470 that the vote weights, selected specific regions, and selected region sets have changed, it is judged that the processing is not converged (NO in S2470), and the process returns to the evaluation step S2440 to execute the evaluation process again.

With the aforementioned learning method, the vote weights of the region sets are normalized, and the numbers of selected specific regions and selected region sets and their constructions are adjusted according to their effectiveness. For this reason, only the necessary specific regions and region sets are selected, and weighted voting in consideration of reliabilities based on the orientations of the detected region sets is executed. Also, occurrence of voting errors due to region sets constructed by fewer specific regions can be suppressed, thus improving the recognition accuracy of the target object.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-281008, filed Dec. 16, 2010, which is hereby incorporated by reference herein in its entirety.

What is claimed is:

1. A method for setting weights for outputs of detectors detecting regions of a target object, the method comprising:
    selecting a plurality of specific regions from a stored three-dimensional model of a target object;
    generating detectors used to detect each region, corresponding to the selected plurality of specific regions, from an image including the target object;
    detecting each region, corresponding to the selected plurality of specific regions, from the image including the target object using the generated detectors;
    deriving a position and an orientation of a predetermined region of the target object, using an output of each detected region;
    evaluating an error of the derived position and orientation of the predetermined region of the target object; and
    setting weights for outputs of the detectors according to a result of evaluating the error of the derived position and orientation of the predetermined region of the target object.

2. The method according to claim 1, further comprising:
    controlling to repetitively execute the evaluating of the error and the setting of weights when differences between already set weights and newly set weights exceed a predetermined threshold, and judging that the set weights are converged to settle the voting weights when the differences between the already set weights and the newly set weights fall within the predetermined threshold range.

3. The method according to claim 1, wherein setting weights further comprises:
    calculating, from the results of the evaluated error, an accumulated value of values of weights of region sets normally detected at detection accuracies with a predetermined error range and an accumulated value of values of weights of region sets which are erroneously detected beyond the error range; and
    updating the weights so that the accumulated value of the values of the weights of the normally detected region sets is not less than a threshold, and the accumulated value of the values of the weights of the erroneously detected region sets is less than the threshold.

4. The method according to claim 3, wherein setting weights further comprises:
    deleting a region set when a maximum value of the updated weights is less than a predetermined threshold in association with that region set; and
    adding a new specific region when a position and orientation of the region set are not obtained based on the results of the evaluated error.

5. The method according to claim 1, further comprising:
    selecting specific regions of the stored three-dimensional model, which are correctly detected at detection accuracies within a predetermined error range and are used to reconstruct a region set of the target object, based on the result of evaluating the error,
wherein selecting the specific regions comprises:
calculating a concurrent detection rate at which a plurality of region sets of the target object are concurrently detected as a position and an orientation within a predetermined error range at an identical image capturing position of evaluation results, which are obtained when a plurality of region sets of the target object are captured from a plurality of image capturing positions; and
selecting specific regions of the stored three-dimensional model, which respectively construct a plurality of region sets of the target object having the calculated concurrent detection rate, which are larger than a predetermined threshold, as specific regions which construct one new region set of the target object, generating the new region set from the selected specific regions, and adding the new region set to the region sets.

6. A method for executing recognition processing of a target object using detectors, comprising:
acquiring the image of the target object captured by the image capturing unit;
detecting, using detectors generated by the method of claim 1, a plurality of specific regions as images of partial regions of the target object included in the image from the acquired image;
voting for estimated positions and orientations output for each region set of the target object based on weights for outputs of the detectors; and
estimating a position and an orientation based on the detected plurality of specific regions and weights for outputs of the detectors.

7. An apparatus for setting weights for outputs of detectors detecting regions of a target object, the apparatus comprising:
a selection unit adapted to select a plurality of specific regions from a stored three-dimensional model of a target object;
a generating unit adapted to generate detectors used to detect each region, corresponding to the plurality of specific regions, from an image including the target object;
a detecting unit adapted to detect each region, corresponding to the selected plurality of specific regions, from the image including the target object using the generated detectors;
a deriving unit adapted to derive a position and an orientation of a predetermined region of the target object, using an output of each detected region;
an evaluation unit adapted to evaluate an error of the derived position and orientation of the predetermined region of the target object; and
a normalization unit adapted to set weights for outputs of the detectors according to a result of evaluating the error of the derived position and orientation of the predetermined region of the target object,
wherein at least one of the claimed units is implemented by a processor.

8. The apparatus according to claim 7, further comprising:
a convergence judgment unit adapted to control to repetitively execute processes of said evaluation unit and said normalization unit when differences between already set weights and newly set weights by said normalization unit exceed a predetermined threshold, and judging that the weights set by said normalization unit are converged to settle the voting weights when the differences between the already set weights and the newly set weights fall within the predetermined threshold range.

9. An apparatus for executing recognition processing of a target object using detectors, comprising:
an acquisition unit adapted to acquire the image of the target object captured by the image capturing unit;
a detection unit adapted to detect, using detectors generated by a generating unit in the apparatus of claim 7, a plurality of specific regions as images of partial regions of the target object included in the image from the image acquired by said acquisition unit;
a voting unit adapted to vote for estimated positions and orientations for each region set of the target object based on weights for outputs of the detectors; and
an estimation unit adapted to estimate a position and an orientation of the target object based on the detected plurality of specific regions and weights for outputs of the detectors.

10. A non-transitory computer readable storage medium storing a program for controlling a computer to execute the method of claim 1.

11. A non-transitory computer readable storage medium storing a program for controlling a computer to execute the method of claim 6.

12. An information processing system comprising:
the apparatus of claim 7, which generates detectors; and
the apparatus of claim 9, which executes recognition processing of the target object using the detectors generated by the apparatus of claim 7.

13. The method according to claim 6, further comprising:
generating region sets as combinations of specific regions of the target object, which fall within a predetermined distance range, of the detected plurality of specific regions of the target object; and
calculating pieces of detected position information of the target object with reference to a coordinate system of the image capturing unit and pieces of coordinate position information of the three-dimensional model of the target object in association with the generated region sets of the target object, and setting a position which minimizes a difference between the detected position information of the target object and the coordinate position information of the stored three-dimensional model, and an orientation corresponding to the position, as an estimated position and an estimated orientation of each region set of the target object.

14. The method according to claim 1, wherein weights corresponding to the orientations of the target object are set according to the result of evaluating the error of the selected plurality of specific regions of the stored three-dimensional model.

15. The apparatus according to claim 9, further comprising:
a generation unit adapted to generate region sets of the target object as combinations of specific regions, which fall within a predetermined distance range, of the plurality of specific regions of the target object detected by said detection unit; and
a region set estimation unit adapted to calculate pieces of detected position information of the target object with reference to a coordinate system of the image capturing unit and pieces of coordinate position information of the three-dimensional model of the target object in association with the region sets of the target object generated by said generation unit, and setting a position, which minimizes a difference between the detected position information of the target object and the coordinate position information of the stored three-dimensional model, and an orientation corresponding to the position, as an estimated position and an estimated orientation of each region set of the target object.

16. The apparatus according to claim 7, wherein said normalization unit sets weights corresponding to the orientations of the target object according to the result of evaluating the error of the selected plurality of specific regions of the stored three-dimensional model.

* * * * *